Nov. 22, 1960 W. C. LANNING 2,961,535
AUTOMATIC DELAY COMPENSATION
Filed Nov. 27, 1957
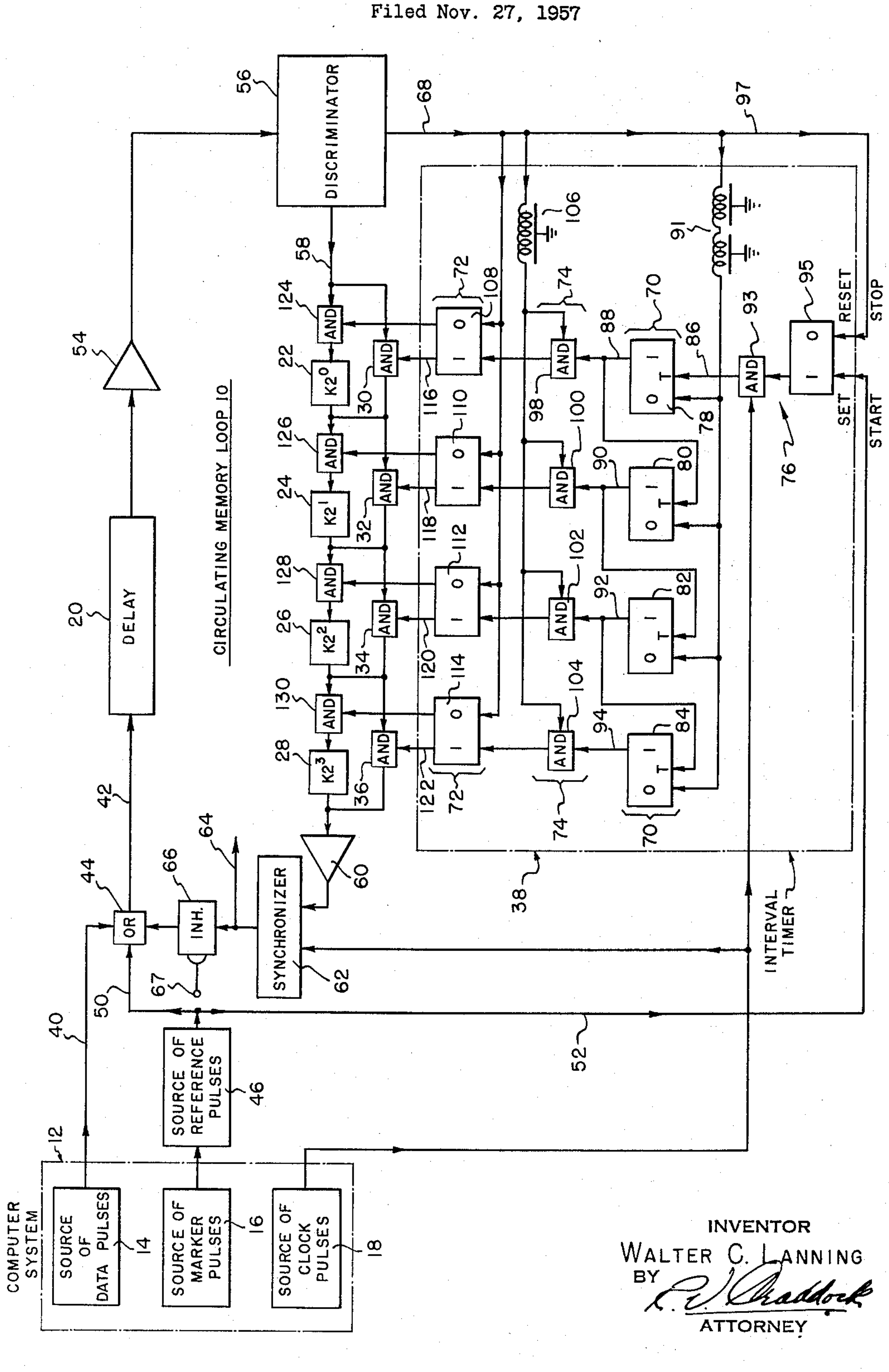
INVENTOR
WALTER C. LANNING
BY [signature]
ATTORNEY Patented Nov. 22, 1960

2,961,535

AUTOMATIC DELAY COMPENSATION

Walter C. Lanning, Plainview, N.Y., assignor to Sperry Rand Corporation, Great Neck, N.Y., a corporation of Delaware Filed Nov. 27, 1957, Ser. No. 699,330

16 Claims. (Cl. 328—55)

This invention relates to automatic compensation for changes in delay time of apparatus in electrical systems and more particularly in connection with delay devices used in data storage systems.

Delay devices employed in serial data storage systems are generally subject to undesirable changes in delay due to environmental and operating conditions, for example, temperature changes. In order to hold the delay tolerances to acceptable limits, the prior art has resorted to expensive expedients such as use of precision materials and engineering in the delay devices, and in the case of changes due to temperature, expensive means such as "hold" ovens have been employed to hold the ambient constant and thereby obtain a more constant delay time. The accurate automatic compensating circuit of the present invention makes it feasible to employ relatively inexpensive and poor delay devices and still obtain substantially constant delay characteristics.

It is, therefore, an object of this invention to provide novel apparatus for automatically compensating for delay changes of a delay device.

Another object of the invention is to provide novel apparatus for compensating for delay changes in delay apparatus of serial data storage systems.

One aspect of the present invention contemplates automatic compensation for changes in delay of a delay device by adding or subtracting delay to and from the system in response to timing means, whose output is a function of the transit time of a reference pulse through the delay device. In accordance with one embodiment of the present invention a reference signal is applied to a delay device, and an interval timer, which is started and stopped in response to the reference signal before and after passage through the delay device, provides a digital signal which controls the addition or subtraction of delay increments to or from the system as required to compensate for delay changes, thus obtaining extremely accurate delay compensation.

Other objects and advantages of the present invention will become apparent from the specification taken in connection with the accompanying drawing wherein a diagram illustrates one form of the invention as embodied in a serial data storage system in a digital computer environment.

In the drawing a storage system in the form of a circulating memory loop 10 is shown in connection with digital apparatus 12 such as a computer system which may have sources 14, 16 and 18 of data pulses, marker pulses and clock pulses respectively, all generally tied in predetermined desired time relations to the clock pulses. Marker pulses usually have a lower repetition rate than the clock pulses, and may be used as a convenient reference background to recognize the beginning of "words" or word groups of the data. In point of time they usually occur in spaces before the words or groups of words to be marked. Included in the memory loop 10 is a delay device 20 subject to undesirable delay changes for which compensation is made by selectively adding or subtracting auxiliary delay sections 22, 24, 26 and 28 to and from the memory loop 10 through the medium of by-pass switches 30, 32, 34, 36 connected across the respective delay sections, which switches respond to the output of an interval timer 38 that is started and stopped in response to the respective entrance and exit of a reference pulse passing through the delay device 20 between data signals. The by-pass switches may take the form of AND gates as indicated.

Data signals for example in the form of spaced digital characters are supplied by the data source 14 over a line 40 to the input line 42 of the delay device 20 through an OR gate 44.

A reference pulse from a source 46 is concurrently supplied to the input line 42 of the delay device 20 through a line 50 and the OR gate 44, and to the interval timer 38 through a start input line 52 to start the timer. The reference pulses are arranged to be supplied to the input line 42 in spaces or intervals between data signals to avoid interference with the data. This may be accomplished for example by generating a periodic marker pulse (source 16) to occur during periodic spaces between data signals, and synchronizing the output of a relatively low frequency oscillator with the marker pulse to obtain a low frequency reference pulse. Unless the changes in the delay line occur in rapid wide swings, a low frequency reference pulse for example 10 per second is adequate. To make the compensating circuit respond to the reference pulses, they should be distinguishable from the data pulses in some characteristic, such as width, amplitude, etc. As a comparative example, the width or duration of the data pulses may be 1$\mu$ sec. while that of the reference pulse may be 3$\mu$ sec.

Signals, including the data and reference pulses, applied to the input 42 of the delay device 20 are, after passage through the delay device, amplified by an amplifier 54 whose output is applied to a discriminator 56 which detects and separates the data and reference pulses sending out the data pulses over a line 58 to the network of auxiliary delay sections through which the data pulses pass into an amplifier 60 and thence through a synchronizer 62 back to the input 42 of delay 20 for re-circulation through the memory loop which includes the delay 20, amplifier 54, the data side of the discriminator 56, the network including the auxiliary delay sections and associated switching, the amplifier 60 and synchronizer 62. The latter synchronizes the data pulses with the proper clock pulses. The data circulating through the memory loop may be read out at 64 by coupling that point to apparatus for such purposes, for example other computing elements, display apparatus, etc. An inhibit means or gate may be inserted in the memory loop at 66 to clear the loop of its data content in response to an inhibit signal at 67.

In order to recognize the data upon readout from the memory loop, the data pulses must be in synchronism with the corresponding clock pulses when read out. The delay adjustment by additions or subtractions of delay increments as provided by the invention herein only needs to bring the data pulses within "reach" of the synchronizer 62. For example, synchronizers known and used in the art for such purposes are capable of synchronizing data pulses with the proper clock pulses, as long as the system pulls a data pulse within the interval of two adjoining clock pulses and just ahead of the corresponding clock pulse. Because such synchronizers are well known, details of synchronizer 62 are omitted.

While the discriminator 56 detects and transmits the data through line 58 for re-circulation through the memory loop, the discriminator also detects the reference pulses which then pass through line 68 to the interval timer 38, where the delayed reference pulse among other functions clears the past setting of the auxiliary delay section by-pass switches 30–36, stops the interval timer, and applies the output of the timer to the by-pass switches in an arrangement which is a function of the transit time of the reference pulse through the delay device 20. The arrangement is such as to compensate for any changes in delay time from a desired norm.

The interval timer 38, shown by way of example, counts the pulses of a train of pulses occurring during the interval between two signal occurrences and provides a digital representation indicative of the number of pulses that have occurred during the interval, and thereby a measure of the interval itself.

Included in the interval timer 38 are the following functional units: a counter, for example a binary counter as shown at 70, a temporary storage register unit 72, a transfer system 74 for transferring the counter output to the register 72, and a mechanism 76 for starting and stopping the counter 70.

The counter 70 includes a plurality of serially cascaded binary storage components, which may be bistable devices as symbolized at 78, 80, 82 and 84 for example, bistable multivibrators. In addition to those indicated at 78–84, a number of other bistable devices are employed in the rest of the circuit of the exemplary embodiment shown. While recognizing that other conventions and arrangements for producing the desired results may be employed, the following conventions are adopted for the bistable devices, unless otherwise indicated. The two possible states may represent the digits 0 and 1 and are indicated on opposite sides of the rectangular bistable symbols. An input signal applied to the 0-side of the bistable device will cause the device to assume the 0-state if it is not already in this state. Likewise, an input signal applied to the 1-side of the device will flip the device to the 1-state. If the device is equipped with a common trigger T, then an input signal applied to the trigger will cause the device to reverse its state, regardless of the state existing prior to the receipt of the trigger signal. The state of the device is indicated by an output produced either at the 1-side or the 0-side depending on the state. Depending on the particular need, output lines may be connected to one or to both sides of the device. It is usual to refer to the 1-side input as the "set" input, and to signals applied thereto as "set" signals, while the input to the 0-side is referred to as the "reset" or "clear" input, and a signal applied to it as a "reset" or "clear" signal.

The serially cascaded arrangement of the binary storage devices in the counter 70 is conventional and the operation of the counter upon the application of pulses to the 1st stage 78 is well known and need not be detailed here, except for a brief review. The composite counter can assume and the output lines therefrom will indicate $X^n$ possible states, where $n$ is the number of stages and X is the number of possible states that each bistable device can assume. Thus, where the counter has four stages as in the example shown, it can assume $2^4$ or sixteen possible states. Assuming that the storage devices 78, 80, 82 and 84 are cleared, i.e., all in the 0-state, a series of pulses applied to the input trigger line 86 of the 1st stage of the counter will provide an output at the output terminals 88, 90, 92 and 94, of the devices 78–84 which is a binary representation of the number or of a function of the number of pulses applied to the input line. In the configuration shown, output signals at the respective terminals 88, 90, 92 and 94 indicate the decimal equivalents 1, 2, 4 and 8 respectively. Thus, for example if a particular state is manifested by output signals appearing at 90 and 92 only, this will indicate the binary 0110 and decimal 6. The reset input terminals of the bistable devices 78–84 are connected through a delay element 91 to the line 68, and from this it will be apparent that a signal on line 68 will, after delay through 91, clear the counter 70.

The start and stop mechanism 76, may be a switching mechanism such as that shown which includes an AND gate 93 and a bistable device 95 connected to apply a signal to the AND gate when the device 95 is in the set or 1-state. Periodic pulses to be counted are fed to the input line 86 of the counter 70 at appropriate times from a stable source of pulses for example, the master clock 18 of the computer 12, through the AND gate 93 which gates the pulses when the bistable device 95 has been placed in the 1-state by the receipt of a pulse on its set input line through the interval timer start line 52. Gate 93 is closed when the device 95 is in the 0-state as a result of the receipt of a signal at its reset input through the stop input line 97 of the interval timer 38.

In order to transfer the counter output to the storage unit 72 at appropriate times, outputs 88, 90, 92 and 94 of the bistable devices are connected respectively to one set of input terminals of AND gates 98, 100, 102 and 104 whose other input terminals are connected through a delay device 106, such as an LC or an RC circuit, to the line 68 for the receipt thereover of the delayed reference pulse. The outputs of the AND gates 98, 100, 102 and 104 are connected respectively to the 1-side inputs of storage devices 108, 110, 112 and 114, while the respective output lines 116, 118, 120 and 122 of the 1-side of these devices are connected as inputs to the AND gates 30, 32, 34 and 36 respectively to selectively control the opening and closing thereof. The output lines 116, 118, 120 and 122 constitute the binary output of the interval timer 38.

To insure complete removal of a delay section from the memory loop when its associated by-pass switch is closed by the timer output, AND gates 124, 126, 128 and 130 may be inserted in series with the respective delay sections, with one set of inputs thereto connected to the 0-side output lines of the respective storage elements 108, 110, 112 and 114. Thus when a storage element is in the 1-state, the by-pass gate connected to its 1-side output line will be closed while the gate connected to its 0-side output line will be open, and the converse when the state of the storage element is reversed. It should be noted that the data pulses are applied to inputs of AND gates 30 and 124, through line 58 and to inputs of AND gates 126, 128, 130 and of the by-pass AND gates 32, 34 and 36 either through preceding auxiliary delay sections which are effectively in the memory loop or through the preceding ones of by-pass AND gates which have by-passed their associated delay sections.

Storage devices 108, 110, 112 and 114 may for example, be bistable devices, such as bistable multivibrators. The reset or 0-inputs to storage devices 108–114 are connected to line 68, and upon receipt of the delayed reference pulse over line 68 will return the devices 108–114 to the 0-state or binary zero, the initial starting point.

Maximum utilization of the output of the interval timer 38 is obtained by employing the output to selectively control the addition and subtraction to and from the memory loop of the same number of incremental delay units as there are possible output states of the interval timer. In the example shown, this number is 16 and the output is the 4-place natural binary code. Thus the four delay sections are arranged to have multiples of a delay increment K progressing geometrically by a constant ratio of 2 as follows: Delay section 22$=K2^0=K$; delay section 24$=K2^1=2K$; delay section 26$=K2^2=4K$; and delay section 28$=K2^3=8K$. The four delay sections provide 16 possible incremental variations of delay including the value 0 (all delay sections shunted).

In order to provide a large data storage capacity to a circulating memory loop the delay device in the loop has a relatively long delay time which in terms of clock pulse count may be of the order of thousands of pulses, far beyond the capacity of a counter with a small number of stages. The capacity of the example shown at 70 is 16, and a pulse train with more than 16 pulses will continue recycling the counter as many times as 16 is wholly contained in the train of pulses being counted, the end count of the counter indicating only the excess of pulses over the multiple of 16 contained in the measured pulse train. For example, 1150 pulses would cycle the counter shown 71 times and end up with binary 1110 or a count of decimal 14.

Although the normal or standard delay of the delay device may be long in terms of numbers of clock pulses, the expected variation in delay in either direction, due for example to temperature changes is usually only a few clock pulses long. For example a mercury ultrasonic delay line with a standard delay of one or two thousand clock pulses (each clock pulse 1$\mu$ sec. duration), may have an expected maximum deviation in delay of 5 or 6 clock pulses in either direction. Although the capacity of the counter is small compared to the pulse count length of the delay device, the expected changes in delay may be detected by the timer by arranging the parameters of the system so that the standard desired delay of the delay device 20, under normal operating conditions, will have a duration in pulse count that is equal to a multiple of the capacity of the counter plus a number equal to about one-half the capacity of the counter. In the example discussed this would be $16M+16/2$ where M is an integer and 16M is the multiple of the timer capacity. This will allow detection of delay changes involving as much as 7 pulses of delay in one direction and 8 pulses of delay in the other direction. For a particular example, measured in terms of the pulses counted by the counter 70, the delay in the delay device 20 under normal operating conditions may be 1032 pulses, which would leave an end count of binary 1000 in a 4-stage binary counter. In this example, as long as the maximum expected variation due to changes in operating conditions is 7 pulses in one direction and 8 pulses in the other direction, the deviation from the normal end count in the digital output of the interval timer 38 will be proportional to the change in delay from the standard at normal operating conditions. The number of complete cycles of the timer always being the same their pulse count is implicit in the counter output and the interval timer output is therefore a function of the transit time of the reference pulse through the delay device 20.

To be able to employ the interval timer output to add and subtract the proper number of increments of K delay to and from the memory loop to compensate for variations from normal, the system is arranged so that under normal operating conditions the total desired delay in the memory loop includes the delay device 20 and the necessary auxiliary delay sections to provide about the same number of K increments of delay as the number representing half the capacity of the counter. In the specific example given, the total standard delay in the memory loop includes 7K delay increments plus the delay device 20. This arrangement allows 7 incremental changes of delay in one direction and 8 in the other direction out of the total capacity of 16 possible incremental delay variations of the delay sections 22–28. The system is further arranged to add increments of K to the memory loop as the delay decreases (as pulse count decreases), and to subtract increments of K as the delay increases (as pulse count increases). The above is accomplished by the illustrated connections between the output of the interval timer 38 and the by-pass switches 30–36 across the delay sections 22–28.

The suggested arrangement, with a standard delay of 1032 clock pulses, "biases" the apparatus under normal operating conditions to provide at the output of the interval timer 38 a binary count of 1000 as a result of $16M+16/2$ pulses (length of delay in delay device 20 in terms of clock pulses; $M=64$ in example).

Under normal operating conditions the specific example will operate as follows: During a space or interval between data signals one of the periodic reference pulses from the source 46 is simultaneously applied to the delay device 20 and to the start terminal of the interval timer 38 thus starting the counter 70 by gating clock pulses into it. In the meantime, the reference pulse passes through the delay device 20 and amplifier 54, after which the delayed reference pulse is detected by the discriminator 56 and flows through line 68 to the stop terminal of the interval timer 38 to stop the counter 70, and to the reset terminals of the storage register 72 to clear the latter. For the example being considered, 1032 pulses would have been gated into the counter which after being cycled 64 times would provide an end binary count 1000. After a slight delay due to delay element 106, the delayed reference pulse coming over line 68 is applied to the AND gates 98–104 to transfer the counter output to the storage register 72 whose binary output lines, which incidently constitute the interval timer output, will apply the binary 1000 signal to the AND gates 30–36. With binary 1000 in the output, storage element 114 will be in the 1-state while the other storage elements 108, 110, and 112 will be in the 0-state. Thus the interval timer 38 will supply a signal only to one by-pass switch (gate 36) thereby providing a by-pass path around delay section 28 for data signals passing through the memory loop. The AND gates 30, 32 and 34 being unaffected by the interval timer output, delay sections 22, 24 and 26 (totaling 7K of delay) will be included in the memory loop together with the delay device 20. After a further short interval due to delay element 91, the delayed reference pulse coming over line 68 will be applied to the reset inputs of bistable devices 78 to 84 to clear the counter 70 for the next compensating cycle of operation initiated by the next periodic reference pulse.

The complete operational cycle described immediately above was under normal operating conditions which provides the desired standard delay time in the memory loop. If for some reason there is a departure from normal operating conditions and the delay of the delay device 20 increases from the desired standard delay for example by a pulse count of 5, the interval timer 38 in response to the entrance and exit of the reference pulse through the delay device 20 will register a binary count of 1101, thus signalling gates 30, 34 and 36 to shunt delay sections 22, 26 and 28, thereby leaving delay section 24 (equalling 2K delay) in the memory loop together with the delay device 20.

If the departure from normal is in the other direction for example a decrease in delay from the desired standard, the pulse count will be less, and fewer delay increments K will be shunted. For example, if the pulse count would be binary 0110, delay sections 24 and 26 would be shunted and there would remain in the memory loop delay sections 22 and 28 totaling 9K delay coupled to the delay device 20.

It will be appreciated that while the particular operational cycle described herein as an example involved a bias or starting point of zero in the counter 70, it may be biased to any initial starting point other than zero if desired. Thus instead of applying the delayed reference pulse to only the reset terminals of the counter to clear the counter to binary zero, it may be alternatively applied to a combination of reset and set terminals of the counter stages that will provide a desired initial bias or starting point other than zero.

AND and OR gates being well known in the art need no further description. Likewise pulse discriminators for passing pulses of one type and rejecting those of other types are well known. Therefore, discriminator 56 which in the specific example is a pulse width discriminator which passes the data pulses to line 58 but rejects the reference pulses from that line, and which passes the reference pulses to line 68 but rejects the data pulses from that line, need not be described in detail.

The delay device 20 need not be confined to any particular type as the invention may be practiced with any type of delay device—for example, lumped delay lines, distributed delay lines, electromechanical delays, sonic and ultrasonic delay tanks and lines, etc. Likewise the delay sections 22–28 may be any of the many known types of delay elements such as LC circuits, RC circuits, etc.

When employing sonic or ultrasonic delay devices in memory loops, it is customary to precede the delay device with a modulator and a carrier source, for example a 20 megacycle carrier, and to follow the delay device with a demodulator to remove the carrier. In such an arrangement the data and other pulses supplied to the memory loop modulate the carrier, and after emergence from the device the demodulator removes the carrier and transmits the original information to the rest of the loop. Such arrangements are not required to be shown to present the inventive concept and must be implied in the system together with other apparatus normally used in these systems such as power drive amplifiers, etc.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Automatically variable delay apparatus comprising a delay circuit including a delay device subject to deviation from a norm, a plurality of delay sections, storage means whose output selectively controls the addition and subtraction of said delay sections to and from said circuit, means for applying a reference signal to said delay device, a counter which starts counting in response to the entry of the signal into the delay device, means responsive to the exit of said signal from said delay device for stopping the counter in order to end said counting, means responsive to the exit of said signal from said delay device for setting the storage means to a desired starting point, means responsive to the exit of said signal from said delay device for transferring the counter output to the storage means, means responsive to the exit of said signal from said delay device for setting the counter to a desired starting point, and means responsive to said storage means for adding or subtracting delay sections as required to compensate for said deviation.

2. Automatically compensated delay apparatus comprising a delay device for receiving and delaying information signals and having an input end and an output end, the delay time of said device being subject to changes, interval timer means, a circuit path having one end connected to said input end of the delay device, a plurality of delay sections adapted to be selectively added to and subtracted from said circuit path in response to the delay time of said delay device, means for applying a reference signal to the input of said delay device and for substantially simultaneously causing said interval timer means to start timing, discriminator means coupled to the output end of said delay device for discriminating between the information signals and the reference signal, means for applying the information signal output of the discriminator to the other end of said circuit path, and means responsive to the reference signal output of the discriminator means for causing the interval timer means to stop timing, whereby the output state of the timer means representing the interval between said start and stop is a function of the delay time of said device, said timer means having a plurality of output states each a function of and attainable in response to a different delay time of said device, and each state being operable to control the connection of a different combination of said sections into said circuit path.

3. Automatically variable delay apparatus comprising a delay device for receiving and delaying information signals and having an input end and an output end, a circuit path having one end connected to said input end of the delay device, a plurality of delay sections, interval timer means including a counter and storage means, said storage means having a plurality of states each controlling the connection of a different combination of said sections into said circuit path, means for applying a reference signal to the input of said delay device and for simultaneously beginning a count in said counter, discriminator means coupled to the output end of said delay device for discriminating between the information signals and the reference signal, means for applying the information signal output of the discriminator means to the other end of said circuit path, means responsive to the reference signal output of the discriminator means for setting the storage means to a desired initial point, means responsive to the reference signal output of the discriminator means for ending said count, means responsive to the reference signal output of the discriminator means for transferring said count from the counter to the storage means, and means responsive to the reference signal output of the discriminator means for setting the counter to a desired initial point.

4. Apparatus comprising a delay circuit, a delay device in said circuit, the device being subject to delay time changes, means for applying a signal to said delay device, counting means having a series of output places each representative of a different numerical value, said counting means being operable to start counting periodic occurrences and to stop said counting in response to the respective entry and exit of said signal into and out of said delay device thereby obtaining a count which is a function of the delay time of said device, and a series of delay sections corresponding to said series of output places and adapted to be selectively added to and subtracted from said circuit in response to the state of said output places, each section having a different incremental delay value corresponding to the numerical value of a different one of the output places, the state of association of each section with said circuit being controlled by the state of the corresponding output place, whereby the delay time of said circuit is changed in response to changes of the delay time of said device.

5. Apparatus comprising a delay circuit, a delay device in said circuit, the device being subject to delay time changes, means for applying a signal to said device, counting means which counts periodic occurrences, said counting means having a plurality of different output states each representing a different value of count within the capacity of the counting means, said counting means being operable to start a count and to stop said count in response to the respective entry and exit of said signal into and out of said delay device, said count being a function of the delay time of said device, and a network in said circuit including a plurality of delay sections, means responsive to each of said output states for causing said network to assume a different one of a plurality of combinations of delay sections, each combination having a different delay time and each being selected in response to a different one of said output states, whereby the delay time of said circuit is changed in response to changes of the delay time of said device.

6. Apparatus comprising a delay circuit including a delay device whose delay time is subject to deviation from a norm, means for applying a first signal to said delay device, means responsive to the respective entry and exit of said signal into and out of said device for producing a second signal which is a function of the delay time of said delay device, and means responsive to said second signal for increasing or decreasing the delay time of said delay circuit as required to compensate for said deviation.

7. Apparatus comprising a delay circuit including a delay device whose delay time is subject to deviation from a norm, means for applying a signal to said delay device, an interval timer operable to start timing and stop said timing in response to the respective entry and exit of said signal into and out of said device for providing a timer output which is a function of the delay time of said device, and means responsive to said timer output for increasing the delay time of said circuit to compensate for a decrease of delay time from said norm, and means responsive to said timer output for decreasing the delay time of said circuit to compensate for an increase of delay time from said norm.

8. Automatically compensated delay apparatus comprising a delay circuit including a delay device which is subject to delay time deviation from a norm, a counter, a plurality of delay sections adapted to be selectively added to and subtracted from said delay circuit in response to the output of said counter, means for applying a signal to said delay device, means for starting said counter when said signal is applied to the delay device, means for stopping said counter when said signal emerges from said delay device whereby the output of the counter is a function of the delay time of said device, and means responsive to the counter output for adding and subtracting delay sections as required to compensate for said deviation.

9. Automatically compensated delay apparatus comprising a delay circuit, a delay device in said circuit which is subject to delay time deviation, an interval timer, a plurality of delay sections adapted to be selectively added to and subtracted from said delay circuit in response to the output of said timer, means for applying a signal to said delay device, means for causing the timer to start timing at the time the signal is applied to the delay device, means for causing the timer to stop said timing at the time said signal emerges from said delay device, and means responsive to said timer output for adding or subtracting delay sections as required to compensate for said deviation.

10. Automatically compensated delay apparatus comprising a delay device for receiving and delaying information signals and having an input end and an output end, the delay time of said device being subject to deviation from a norm, counting means, a circuit path having one end connected to said input end of the delay device, a plurality of delay sections adapted to be selectively added to and subtracted from said circuit path in response to said counting means, means for applying a reference signal to the input of said delay device and for substantially simultaneously causing said counting means to start a count, discriminator means coupled to the output end of said delay device for discriminating between the information signals and the reference signal, means for applying the information signal output of the discriminator to the other end of said circuit path, means responsive to the reference signal output of the discriminator for causing the counting means to stop said count, whereby the count registered in the counter in response to said starting and stopping is indicative of the delay time of said device, and means responsive to said count for controlling the connections of said delay sections with respect to said circuit path to compensate for said deviation.

11. Apparatus comprising a delay circuit, a delay device in said circuit, the delay time of said device being subject to deviation from a norm, means for applying a signal to said device, counting means which counts periodic occurrences, said counting means having a plurality of different output states each representing a different value of count within the capacity of the counting means, means responsive to the respective entry and exit of said signal into and out of said delay device for respectively starting and stopping the counting of periodic occurrences by said counting means to generate in the counting means an output state indicative of said deviation, and a network in said circuit including a plurality of delay sections which network is adapted to assume one of a plurality of different combinations of delay sections in response to the output state of the counting means, each combination having a different incremental value of delay and each being assumed in response to a different one of said output states, the particular combination associated with each output state providing the necessary delay time modification required to compensate for the deviation indicated by that output state.

12. Automatically variable delay apparatus comprising a delay circuit, a delay device in said circuit, the delay device being subject to changes in its delay time, means for applying a signal to said delay device, a plurality of delay sections adapted to be selectively added to and subtracted from said delay circuit in response to the transit time of said signal through said device, and interval timing means responsive respectively to the entry and exit of said signal into and out of said delay device for measuring said transit time, said interval timing means having a plurality of output states, each representing a different transit time and each controlling the connection of a different combination of said sections into said circuit, whereby the delay time of said circuit is changed in response to changes of the delay time of said device.

13. Automatically variable delay apparatus comprising a delay device whose delay time is subject to changes, means for applying a signal to said delay device, a plurality of consecutive delay sections respectively having multiples of a delay increment progressing geometrically by a constant ratio of two and adapted to be selectively added to and subtracted from said delay device in response to the transit time of said signal through said delay device, and internal timing means responsive to the respective entry and exit of said signal into and out of said delay device for measuring said transit time, said interval timing means having at least as many different output states as the total number of said increments in said delay sections, each output state representing a different transit time and each controlling the connection of a different combination of said delay units to said delay device whereby the delay time of said apparatus is changed in response to changes of the delay time of said delay device.

14. Apparatus comprising a delay circuit, a delay device in said circuit, the device being subject to changes in delay time, means for applying a signal to said device, counting means which counts periodic occurrences and which recycles after its capacity is reached, the delay time of said delay device measured in terms of said occurrences being a number of said occurrences which number is greater than the capacity of said counting means, said counting means having a plurality of different output states each representing a different value of count within the capacity of the counting means, said counting means being operable to start a count and to stop said count in response to the respective entry and exit of said signal into and out of said delay device, said count being a function of the delay time of said device, and a network in said circuit including a plurality of delay sections which network is adapted to assume one of a plurality of different combinations of delay sections in response to the output state of the counting means, each combination having a different value of delay and each being assumed in response to a different one of output states, whereby the delay time of said circuit is changed in response to changes of the delay time of said device.

15. Apparatus comprising a delay circuit, a delay device in said circuit, the device being subject to delay time changes, means for applying a signal to said device, interval timing means responsive respectively to the entry and exit of said signal into and out of said delay device for measuring the transit time of the signal through the device, said interval timing means having a plurality of output states each representing a different transit time, and a network in said circuit including a plurality of delay sections, means responsive to each of said output states for causing said network to assume a different one of a plurality of combinations of delay sections, each combination having a different delay time and each being selected in response to a different one of said output states, whereby the delay time of said circuit is changed in response to changes of the delay time of said device.

16. Automatically compensated delay apparatus comprising a delay device for receiving and delaying information signals and having an input end and an output end, the delay time of said device being subject to deviation from a norm, an interval timer, a circuit path having one end connected to said input end of the delay device, a plurality of delay sections adapted to be selectively added to and subtracted from said circuit path in response to said timer, means for applying a reference signal to the input of said delay device and for substantially simultaneously starting said timer, discriminator means coupled to the output end of said delay device for discriminating between the information signals and the reference signal, means for applying the information signal output of the discriminator to the other end of said circuit path, means responsive to the reference signal output of the discriminator for stopping the timer, whereby the timer output registered in response to said starting and stopping is indicative of the delay time of said device, and means responsive to said timer output for controlling the connections of said delay sections with respect to said circuit path to compensate for said deviation.

References Cited in the file of this patent

UNITED STATES PATENTS

| | | |
|---|---|---|
| 2,730,700 | Serrell | Jan. 10, 1956 |
| 2,745,004 | Yu | May 8, 1956 |
| 2,842,756 | Johnson | July 8, 1958 |